United States Patent Office 3,814,648
Patented June 4, 1974

3,814,648
METHOD OF MANUFACTURING A COLOSTOMY, ILEOSTOMY OR URETEROSTOMY BAG
Arne Brondberg, Sovej 4, DK-3490 Kvistgaard, Denmark
Filed June 20, 1972, Ser. No. 264,665
Claims priority, application Denmark, June 30, 1971, 3,220/71
Int. Cl. B32b 31/18
U.S. Cl. 156—253
2 Claims

ABSTRACT OF THE DISCLOSURE

A method of manufacturing a colostomy, ileostomy or ureterostomy bag of the type comprising an adhesive disc provided with a central opening and welded to the bag so that the entrance opening of the bag is concentric with the opening in the disc, characterized in that the adhesive disc is welded to the continuous wall of the bag over a wide annular zone of closely spaced shuts and that an entrance opening of the desired dimensions is then punched in the bag wall and the adhesive disc simultaneously.

---

Figure 1:
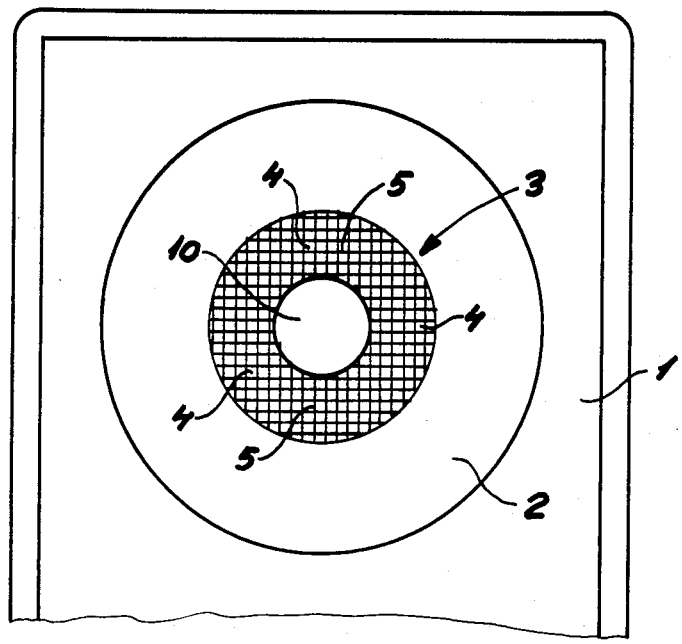

This invention relates to a method of manufacturing a colostomy, ileostomy or ureterostomy bag of the type comprising an adhesive disc provided with a central opening and welded to the bag so that the entrance opening of the bag is concentric with the opening in the disc. It has been found to be exceedingly difficult to obtain a fully efficient welding of the adhesive disc to the bag which obviates the forming of pockets along the inner edge of the entrance opening of the bag because it is necessary to extend the welding right to the edge of the disc and this requires a very great precision in the welding process. On the other hand, an attempt to overcome this drawback by making the welded seam very wide will cause difficulties in the welding operation and require a disproportionally great welding effect but still not ensure an effective welding all over the region.

It is the aim of the present invention to provide a method by which the said drawbacks are eliminated and a fully efficient welding is obtained without the risk of the forming of pockets. This aim has been accomplished by welding the adhesive disc to the continuous wall of the bag over a wide annular zone of closely spaced welded regions and subsequently punching an entrance opening of the desired dimensions in the bag wall and the adhesive disc simultaneously. When using an annular zone of adequate width the precision of the welding will obviously play a minor part and, consequently, the welding can be performed without any difficulty when the annular zone is composed of a plurality of welded regions. Where the welded regions are disposed closely adjacent to each other, the two layers welded together will be in intimate contact in the very narrow areas between the welded regions so that there will be no risk whatever of the forming of pockets or leaks where impurities may accumulate or ooze out. At the same time a considerable rationalization has been achieved in production, since the fact that the punching of the entrance opening is carried out after the welding ensures that the welded zone, irrespective of the size of the opening, will extend right to the edge of the opening. By a simple replacement of the punching tool it will thus be possible to produce bags with entrance openings of different dimensions.

In a very convenient embodiment of the method according to the invention the welding is carried out with an electrode whose annular welding zone, which consists of a plurality of closely spaced welding points, has an inner diameter that is smaller than and an outer diameter that is larger than the largest desired diameter of the entrance opening to the bag. This involves the specific advantage that the same welding tool can be used for bags with entrance openings of any desired size. To ensure that the non-welded areas between the welded regions are kept at a minimum so as to provide density of welding, the welded regions are of square configuration and distributed over the welded zone, each welded region, apart from those disposed on the inner and outer edge of the zone, being closely surrounded by other welded regions.

Figure 2:
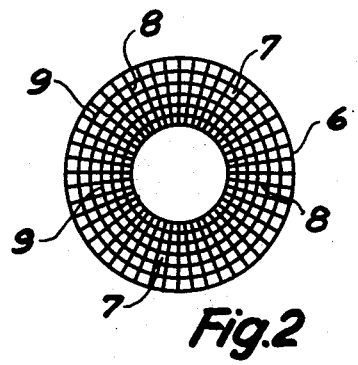

The invention will be described here in greater detail and with reference to the drawing, in which
FIG. 1 shows an embodiment of a colostomy, ileostomy or ureterostomy bag according to the invention viewed in side elevation, and
FIG. 2 shows a welding electrode for use in carrying out the method according to the invention.

FIG. 1 shows the upper section of a colostomy, ileostomy or ureterostomy bag 1 to which is welded an adhesive disc 2. The welding is provided in an annular zone comprising a large number of square welded regions 4 disposed closely adjacent to each other so as to form between them quite narrow, straight nonwelded lines 5 crossing each other. In the centre of the welded zone 3 is an entrance opening 10 to the interior of the bag.

FIG. 2 presents the front of a welding electrode 6 for carrying out the said welding. This electrode comprises a larger number of projecting square electrode members 7, between which are radial grooves 8 and circular grooves 9, all of which form a welding zone of a configuration which is slightly different from that of FIG. 1, but otherwise of the same character and effect.

What I claim is:
1. A method of manufacturing a colostomy, ileostomy or ureterostomy bag in which an exterior adhesive disc having a central opening is welded to the bag so that the entrance opening of the bag is concentric with the central opening in the disc, said method comprising welding the disc to the continuous outer wall of the bag throughout a wide annular zone by forming a plurality of closely spaced welded regions with narrow non-welded channels therebetween, said annular zone having an inner diameter smaller than the smallest desired diameter of the entrance opening of the bag and having an outer diameter larger than the largest desired diameter of said entrance opening, and punching an entrance opening of desired size through the adhesive disc and bag wall simultaneously.
2. A method according to claim 1 which said closely spaced welded regions are formed in a grid pattern.

References Cited
UNITED STATES PATENTS

| | | | |
|---|---|---|---|
| 3,178,330 | 4/1965 | Reddick | 156—253 |
| 3,544,419 | 12/1970 | Gerard | 156—253 |
| 3,352,737 | 11/1967 | Jordan | 156—552 |
| 3,333,523 | 8/1967 | Terzuoli | 93—8 WA |
| 3,392,077 | 7/1968 | Brieske et al. | 156—253 |

DOUGLAS J. DRUMMOND, Primary Examiner
M. G. WITYSHYN, Assistant Examiner

U.S. Cl. X.R.
156—290, 510; 161—112, 146